US012038770B2

(12) United States Patent
Fujiwara et al.

(10) Patent No.: US 12,038,770 B2
(45) Date of Patent: Jul. 16, 2024

(54) REMOTE OPERATION SYSTEM (71) Applicant: HONDA MOTOR CO., LTD., Tokyo (JP)

(72) Inventors: Tatsuro Fujiwara, Tokyo (JP); Akiko Nakamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 322 days.

(21) Appl. No.: 17/665,708

(22) Filed: Feb. 7, 2022

(65) Prior Publication Data
US 2022/0299993 A1    Sep. 22, 2022

(30) Foreign Application Priority Data

Mar. 19, 2021   (JP) ................... 2021-045656

(51) Int. Cl.
| H04N 5/272 | (2006.01) |
| G01S 11/06 | (2006.01) |
| G05D 1/20 | (2024.01) |
| G05D 1/224 | (2024.01) |
| B60W 30/06 | (2006.01) |
| G05D 1/00 | (2006.01) |
| H04N 23/90 | (2023.01) |

(52) U.S. Cl.
CPC .............. G05D 1/20 (2024.01); G01S 11/06 (2013.01); G05D 1/2247 (2024.01); H04N 5/272 (2013.01); B60W 30/06 (2013.01); G05D 1/0016 (2013.01); H04N 23/90 (2023.01)

(58) Field of Classification Search
CPC ................. B60W 30/06; B60W 50/14; B60W 2050/146; G08G 1/168; B62D 15/0285
See application file for complete search history.

(56) References Cited

U.S. PATENT DOCUMENTS

| 2013/0247117 A1 * | 9/2013 | Yamada ................... H04B 5/72 340/12.5 |
| 2019/0286118 A1 * | 9/2019 | Bando ...................... B62D 1/00 |
| 2020/0041992 A1 * | 2/2020 | Nagashima ......... G06F 3/04847 |
| 2020/0201320 A1 | 6/2020 | Yamaguchi |

(Continued)

FOREIGN PATENT DOCUMENTS

| JP | 2019057767 A | 4/2019 |
| WO | WO-2017215874 A1 * | 12/2017 |

*Primary Examiner* — Khoi H Tran
*Assistant Examiner* — Dairon Estevez
(74) *Attorney, Agent, or Firm* — Armstrong Teasdale LLP (57) ABSTRACT

A remote operation system for a moving body, includes: a control device provided on the moving body; and an operation terminal configured to receive input from a user and to communicate with the control device. The moving body includes an external environment sensor that acquires surrounding information of the moving body and a display device. The control device creates a surrounding image including the moving body based on the surrounding information, makes the display device display the surrounding image, and in a case where communication between the control device and the operation terminal is performed, makes the display device display the surrounding image in which at least a part of a communication status display showing a status of communication with the control device is superimposed on an image of the moving body included in the surrounding image.

8 Claims, 5 Drawing Sheets

(56) References Cited

U.S. PATENT DOCUMENTS

| | | | |
|---|---|---|---|
| 2020/0226926 A1* | 7/2020 | Suzuki | B60W 30/06 |
| 2021/0026347 A1* | 1/2021 | Nakashima | B62D 15/0285 |
| 2022/0032874 A1* | 2/2022 | Hayakawa | G08G 1/144 |

* cited by examiner

REMOTE OPERATION SYSTEM

TECHNICAL FIELD

The present invention relates to a remote operation system for a moving body.

BACKGROUND ART

JP2019-057767A discloses a remote operation method for operating a vehicle from outside the vehicle by using an operation terminal such as a smartphone to unpark or park the vehicle. During the execution of the remote operation, the operation terminal captures an image of the vehicle with a camera and acquires the distance between the vehicle and the operation terminal based on the size of the vehicle in the captured image. Then, the operation terminal displays the distance between the vehicle and the operation terminal on a display provided on the operation terminal. By seeing the display, the user can determine whether the distance between the user and the vehicle is appropriate for the remote operation.

The remote operation using the operation terminal may be started in response to a start operation provided by the user to the vehicle. In this case, following the start operation provided to the vehicle, the user needs to activate the operation terminal and communicably connects the operation terminal with the control device of the vehicle. Therefore, it is desired that the control device prompts the user to perform an operation to activate the operation terminal.

SUMMARY OF THE INVENTION

In view of the foregoing background, a primary object of the present invention is to provide a remote operation system that can prompt the user to activate an operation terminal.

MEANS TO ACCOMPLISH THE TASK

To achieve the above object, one aspect of the present invention provides a remote operation system (1) for a moving body (S), comprising: a control device (15) provided on the moving body; and an operation terminal (3) configured to receive input from a user and to communicate with the control device, wherein the moving body comprises an external environment sensor (7) that acquires surrounding information of the moving body and a display device (32), and the control device creates a surrounding image (51) including the moving body based on the surrounding information, makes the display device display the surrounding image, and in a case where communication between the control device and the operation terminal is performed, makes the display device display the surrounding image in which at least a part of a communication status display (58) showing a status of communication with the control device is superimposed on an image (59) of the moving body included in the surrounding image.

According to this aspect, the remote operation system can prompt the user to activate the operation terminal. Since the communication status display is displayed in the surrounding image, the user is less likely to overlook the communication status display. Also, since the communication status display is displayed to be superimposed on the image of the moving body, the image of the surroundings of the moving body can be maintained. Therefore, it is easy for the user to recognize the situation around the moving body.

In the above aspect, preferably, in the surrounding image, an entirety of the communication status display is displayed to be superimposed on the image of the moving body.

According to this aspect, the image of the surroundings of the moving body is maintained in the surrounding image, and therefore, it is easy for the user to recognize the situation around the moving body.

In the above aspect, preferably, the surrounding image is an image showing the moving body and its surroundings as seen from above.

According to this aspect, the user can recognize the moving body and the situation around it.

In the above aspect, preferably, the communication status display includes a display corresponding to "during connection attempt" and a display corresponding to "connection completed."

According to this aspect, the user can recognize the connection status between the operation terminal and the control device by viewing the communication status display.

In the above aspect, preferably, when connection with the operation terminal is completed, the control device makes the display device display a display that prompts the user to exit the moving body together with the surrounding image.

According to this aspect, the user can recognize that the next procedure is to exit the moving body by viewing the display device.

In the above aspect, preferably, the operation terminal has a display unit and, when connection with the control device is completed, makes the display unit display a display that prompts the user to exit the moving body.

According to this aspect, the user can recognize that the next procedure is to exit the moving body by viewing the operation terminal.

In the above aspect, preferably, when the control device determines that the connection between the control device and the operation terminal is completed and the operation terminal has departed from the control device, the control device makes the display unit of the operation terminal display an image for operation of the moving body.

According to this aspect, the user can operate the moving body remotely by using the operation terminal after exiting and departing from the moving body.

In the above aspect, preferably, when the control device determines that the connection between the control device and the operation terminal is completed and the operation terminal has departed from the control device, the control device turns off the display on the display device.

According to this aspect, energy consumption can be suppressed by turning off the display on the display device.

In the above aspect, preferably, the control device determines that the operation terminal has departed from the control device when the control device detects that the connection between the control device and the operation terminal is completed, thereafter a door of the moving body is opened, thereafter the door is closed, and thereafter the door is locked.

According to this aspect, it is possible to determine that the user has departed from the moving body.

In the above aspect, preferably, the control device acquires a distance between the control device and the operation terminal based on a strength of radio wave signal received from the operation terminal and determines that the operation terminal has departed from the control device when the acquired distance is greater than or equal to a prescribed value.

According to this aspect, it is possible to determine that the user has departed from the moving body.

According to the foregoing configuration, it is possible to a remote operation system that can prompt the user to activate an operation terminal.

DETAILED DESCRIPTION OF THE INVENTION

In the following, an embodiment of the present invention will be described in detail with reference to the drawings.

Figure 1:
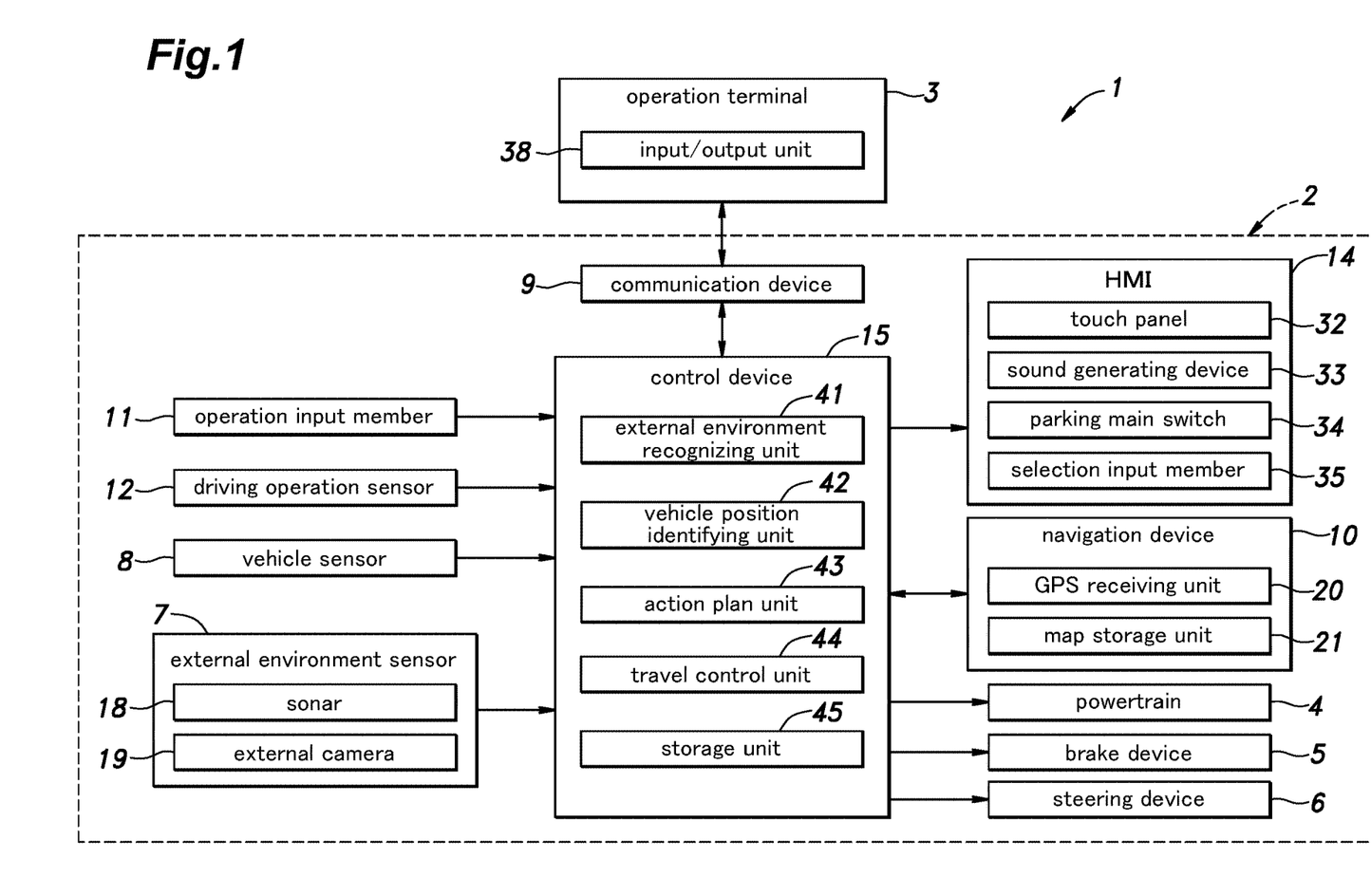
FIG. 1 is a functional block diagram of a vehicle provided with a parking assist system according to an embodiment of the present invention.

As shown in FIG. 1, the remote operation system 1 operates a moving body by a remote operation using an operation terminal 3. Specifically, the remote operation system 1 functions as a parking assist system for moving a vehicle, which serves as the moving body, to a parking space. In the present embodiment, the vehicle is a four-wheel electric car that can travel autonomously using a battery.

The remote operation system 1 includes a vehicle system 2 installed in the vehicle and at least one operation terminal 3. The vehicle system 2 includes a powertrain 4, a brake device 5, a steering device 6, an external environment sensor 7, a vehicle sensor 8, a communication device 9, a navigation device 10, an operation input member 11, a human machine interface (HMI) 14, and a control device 15. The above components of the vehicle system 2 are connected to each other so that signals can be transmitted therebetween via communication means such as a Controller Area Network (CAN).

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission and a shift actuator for changing a shift position of the automatic transmission (a shift position of the vehicle). The brake device 5 is a device configured to apply a brake force to the vehicle. For example, the brake device 5 includes a brake caliper configured to press a brake pad against a brake rotor and an electric cylinder configured to supply an oil pressure to the brake caliper. The brake device 5 may include an electric parking brake device configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquisition device for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object around the vehicle thereby to detect a position (distance and direction) of the object. Multiple sonars 18 are provided at each of a rear part and a front part of the vehicle. In the present embodiment, one pair of left and right sonars 18 is provided on a rear bumper, one pair of left and right sonars 18 is provided on a front bumper, one pair of sonars 18 is provided at a front end portion of the vehicle such that the two sonars 18 forming the pair are provided on left and right side faces of the front end portion of the vehicle, and one pair of sonars 18 is provided at a rear end portion of the vehicle such that the two sonars 18 forming the pair are provided on left and right side faces of the rear end portion of the vehicle. That is, the vehicle is provided with eight sonars 18 in total. The sonars 18 provided on the rear bumper mainly detect positions of objects behind the vehicle. The sonars 18 provided on the front bumper mainly detect positions of objects in front of the vehicle. The sonars 18 provided at the left and right side faces of the front end portion of the vehicle detect positions of objects on left and right outsides of the front end portion of the vehicle, respectively. The sonars 18 provided at the left and right side faces of the rear end portion of the vehicle detect positions of objects on left and right outsides of the rear end portion of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor configured to detect the speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. The vehicle speed sensor may be constituted of multiple wheel speed sensors configured to detect respective wheel speeds (rotation speeds of the respective wheels), for example. The yaw rate sensor consists of a gyro sensor, for example.

The communication device 9 is a device that mediates wireless communication between the control device 15 and the operation terminal 3. The control device 15 communicates with the operation terminal 3 carried by the user via the communication device 9 over Bluetooth™ wireless technology which is a near field wireless communication standard.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (user) to control the vehicle. The operation input member 11 includes a steering wheel, an accelerator pedal, a brake pedal (brake input member), and a shift lever (a shift member). The shift lever is configured to receive an operation for selecting the shift position of the vehicle.

The driving operation sensor 12 detects an operation amount of the operation input member 11. The driving operation sensor 12 includes a steering angle sensor configured to detect a steering angle of the steering wheel, a brake sensor configured to detect a pressing amount of the brake pedal, and an accelerator sensor configured to detect a pressing amount of the accelerator pedal. The driving operation sensor 12 outputs a detected operation amount to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

The operation terminal 3 is a wireless terminal that can be carried by the user, and in the present embodiment, the operation terminal 3 is constituted of a smartphone. The operation terminal 3 has a prescribed application preinstalled therein so that the operation terminal 3 can communicate with the control device 15 from outside the vehicle via the communication device 9.

The operation terminal 3 is equipped with an input/output unit 38. The input/output unit 38 is constituted of a touch panel having a screen. When the operation terminal 3 receives a signal from the control device 15, the operation terminal 3 processes the signal and the input/output unit 38 displays the process result on the screen as appropriate to notify the user. Also, the input/output unit 38 receives input from the user by detecting a touch (contact or pressing) of the user on the screen.

The remote operation system 1 is a system for performing so-called automatic parking to autonomously moving the vehicle to a target position (a target parking position or a target unparking position) selected by the occupant thereby to park or unpark the vehicle.

The control device 15 executes a so-called remote parking to park the vehicle by controlling the vehicle to move the vehicle to the target position according to an operation input to the operation terminal 3. To perform such control of the vehicle, the control device 15 includes an external environment recognizing unit 41, a vehicle position identifying unit 42, an action plan unit 43, a travel control unit 44, and a storage unit 45.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a wheel stopper or an obstacle is present, and obtains the size of the wheel stopper or the obstacle in a case where the wheel stopper or the obstacle is present. Further, the external environment recognizing unit 41 may compute a distance to the obstacle based on signals from the sonars 18 to obtain the position of the obstacle.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space delimited by white lines and the like provided on a surface of a road, a parking lot, and the like.

Also, the external environment recognizing unit 41 creates a surrounding image including the vehicle based on the surrounding information acquired by the external environment sensor 7. The surrounding image includes a look-down image or a plan view showing the vehicle and the surroundings of the vehicle as seen from a viewpoint located above the vehicle and a three-dimensional image (a 3D image or a bird's-eye image) showing at least a part of the vehicle and the surroundings of the vehicle as seen from a viewpoint located obliquely above the vehicle. The external environment recognizing unit 41 executes operation processing according to a program and thereby performs a conversion process of the images (videos) captured by the multiple external cameras 19 so as to generate the surrounding image. The external environment recognizing unit 41 preferably creates a look-down image by combining the images captured by the front camera, the rear camera, and the left and right side cameras, for example.

The vehicle position identifying unit 42 identifies the position of the vehicle having the control device 15 installed therein based on the signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle in which the vehicle position identifying unit 42 is installed by the so-called inertial navigation.

The travel control unit 44 controls the powertrain 4, the brake device 5, and the steering device 6 based on a travel control instruction from the action plan unit 43 to make the vehicle travel.

(Parking Assist Process)

After the vehicle is stopped, when the action plan unit 43 detects an input from the user to the touch panel 32 indicating that the user wants the parking assist under remote operation to be performed, the action plan unit 43 performs a parking assist process. In the following, the parking assist process will be described with reference to the time chart of FIG. 2.

Figure 2:
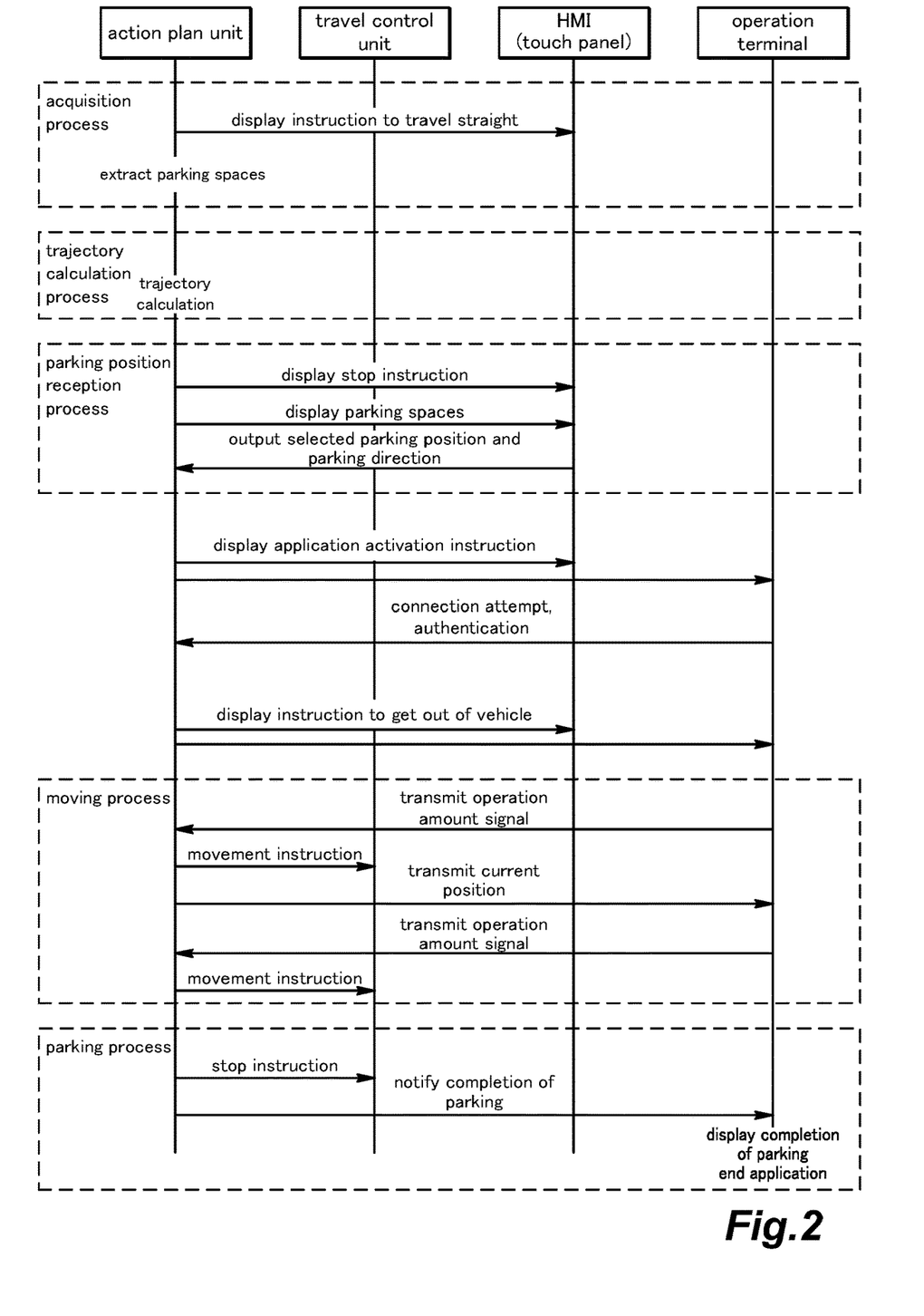
FIG. 2 is a time chart of an automatic parking process performed by the parking assist system according to the embodiment.

During the execution of the parking assist process, the action plan unit 43 makes the touch panel 32 display a parking assist screen 50 (thus, the touch panel 32 functions as a display device). The parking assist screen 50 includes a surrounding image that contains at least the vehicle. In the present embodiment, the parking assist screen 50 includes, in a right half thereof, a look-down image 51 showing the vehicle and the surroundings of the vehicle as seen from a viewpoint located above the vehicle and, in a left half thereof, a three-dimensional image 52 showing the front portion of the vehicle and the surroundings in front of the vehicle as seen from a viewpoint located above a rear portion of the vehicle. Further, the parking assist screen 50 includes instruction windows 53 above and below the three-dimensional image 52. In the instruction windows 53, an operation to be performed by the occupant, a current state of the vehicle, cautions, and the like are displayed by text, for example.

The action plan unit 43 first executes an acquisition process to acquire one or more parking spaces. More specifically, the action plan unit 43 first displays a notification that instructs the user to move the vehicle straight in the parking assist screen 50 displayed on the touch panel 32 of the HMI 14. While the user is moving the vehicle straight, the action plan unit 43 acquires, based on the signal from the external environment sensor 7, a position and size of each detected obstacle and positions of the white lines provided on the road surface. The action plan unit 43 extracts, based on the acquired position and size of the obstacle and the positions of the white lines, one or more spaces in which the vehicle can be parked (namely, parking spaces).

Next, the action plan unit 43 executes a trajectory calculation process to calculate a trajectory of the vehicle from the current position of the vehicle to each extracted parking space. Preferably, the action plan unit 43 calculates the trajectory for each of the forward parking and the backward parking so that an input operation from the user to select the forward parking or the backward parking can be received.

Next, the action plan unit 43 executes a parking position reception process to receive a parking position selected from the one or more parking spaces. Specifically, when the action plan unit 43 acquires at least one parking space, the action plan unit 43 makes one of the instruction windows 53 of the parking assist screen 50 display a notification instructing the user to stop the vehicle. At this time, the instruction displayed on the instruction window 53 may be an instruction to stop the vehicle and thereafter to put the shift lever to the parking position.

Figure 3A:
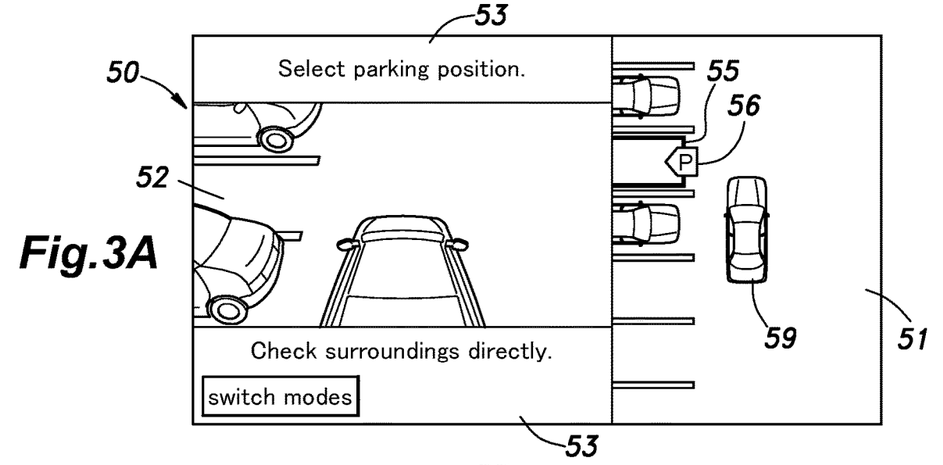
FIG. 3A is a diagram showing a screen display of a touch panel for parking position selection.

After confirming that the vehicle is stopped, as shown in FIG. 3A, the action plan unit 43 displays available parking spaces 55 with a selection icon 56 put on one of the parking spaces 55 that is being selected in the look-down image 51 of the parking assist screen 50 displayed on the touch panel 32. Also, the action plan unit 43 displays, in the upper instruction window 53, a notification prompting the user to select one of the parking spaces 55 in which the vehicle should be parked (the parking space 55 in which the vehicle should be parked is referred to as the parking position). The user changes the parking space 55 on which the selection icon 56 is put by a touch operation on the touch panel 32 or an operation of the selection input member 35. At the center of the look-down image 51, a vehicle image 59 corresponding to the vehicle is displayed.

Figure 3B:
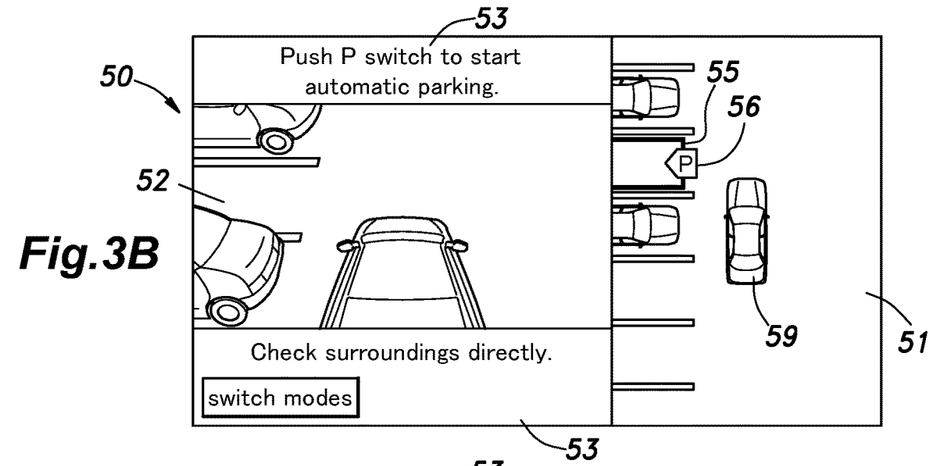
FIG. 3B is a diagram showing a screen display of the touch panel for automatic parking start.

When a prescribed time has elapsed from when the instruction prompting selection of the parking position was displayed in the upper instruction window 53, the action plan unit 43 displays, in the upper instruction window 53, a display prompting the user to decide the parking position by operating the parking main switch (P switch) 34, as shown in FIG. 3B. The display prompting the selection of the parking position and the display prompting the operation of the parking main switch 34 to decide the parking position may be displayed simultaneously. When the user operates the parking main switch 34, the parking space 55 on which the selection icon 56 is put is decided as the parking position, and a signal corresponding to the parking position is output from the touch panel 32 to the action plan unit 43.

Figure 3C:
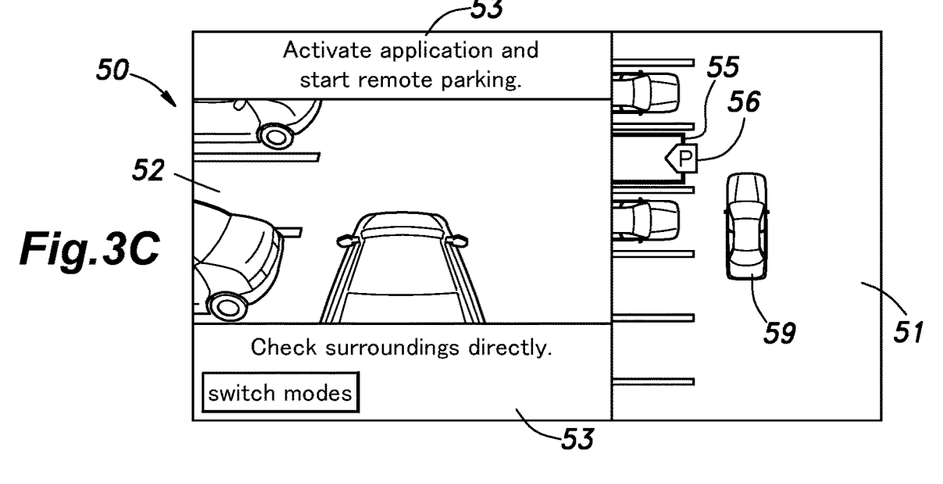
FIG. 3C is a diagram showing a screen display of the touch panel for prompting activation of an application.

Next, as shown in FIG. 3C, the action plan unit 43 displays, in the upper instruction window 53 of the parking assist screen 50, an instruction prompting activation of a remote parking application of the operation terminal 3. Also, the action plan unit 43 may communicate with the operation terminal 3 to make the input/output unit 38 (touch panel) display the instruction prompting activation of the remote parking application.

Figure 4A:
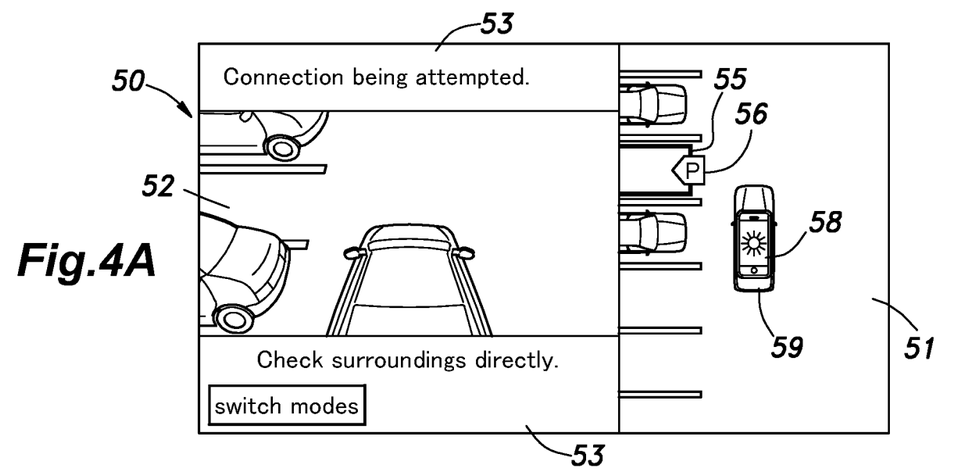
FIG. 4A is a diagram showing a screen display of the touch panel for indicating "during connection attempt"

When the user activates the remote parking application by operating the input/output unit 38 of the operation terminal 3, the operation terminal 3 and the control device 15 communicate with each other, and the control device 15 attempts to make connection with the operation terminal 3. The connection attempt includes establishment of stable communication and authentication of the operation terminal 3. The authentication is a process of confirming whether the operation terminal 3 is a legitimate terminal with which the remote operation of the vehicle is authorized to be performed. When the control device 15 and the operation terminal 3 are communicating each other, the action plan unit 43 displays a communication status display 58 in the look-down image 51 displayed on the touch panel 32, as shown in FIG. 4A. The communication status display 58 is an image indicating the communication status between the operation terminal 3 and the control device 15. In the present embodiment, the communication status display 58 is a figure resembling a smartphone. Preferably, the communication status display 58 changes depending on the connection status between the operation terminal 3 and the control device 15. For example, the communication status display 58 preferably includes a display corresponding to "during connection attempt" and a display corresponding to "connection completed." The communication status display 58 shown in FIG. 4A is the display corresponding to "during connection attempt."

The communication status display 58 is displayed such that at least a part thereof is superimposed on the vehicle image 59 included in the look-down image 51. In the present embodiment, in the look-down image 51 as the surrounding image, the entirety of the communication status display 58 is displayed to be superimposed on the vehicle image 59.

Figure 5A:
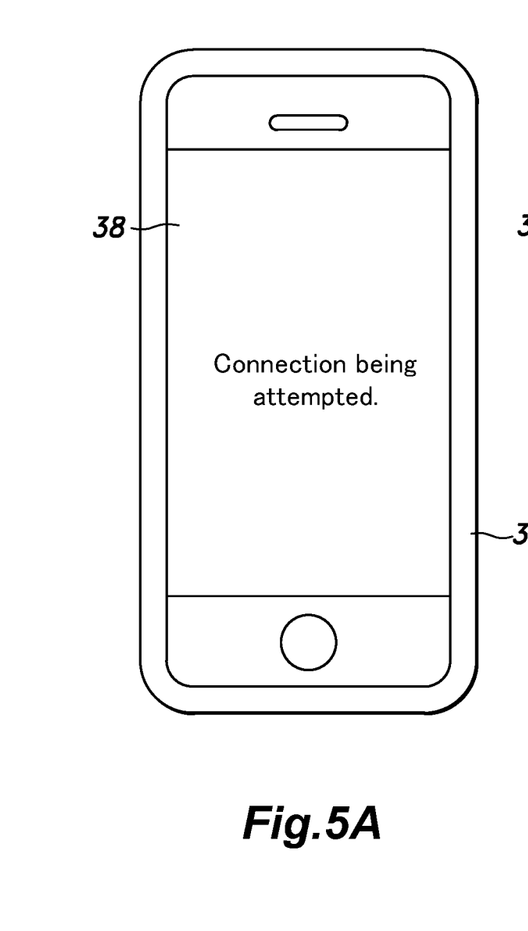
FIG. 5A is a diagram showing a screen display of an operation terminal indicating "during connection attempt"

While the control device 15 is attempting to make connection with the operation terminal 3, the action plan unit 43 displays a notification indicating that the connection status is "during connection attempt" in the upper instruction window 53 of the parking assist screen 50. Also, as shown in FIG. 5A, the operation terminal 3 may display a notification that the connection with the control device 15 of the vehicle is being attempted on the input/output unit 38.

Figure 4B:
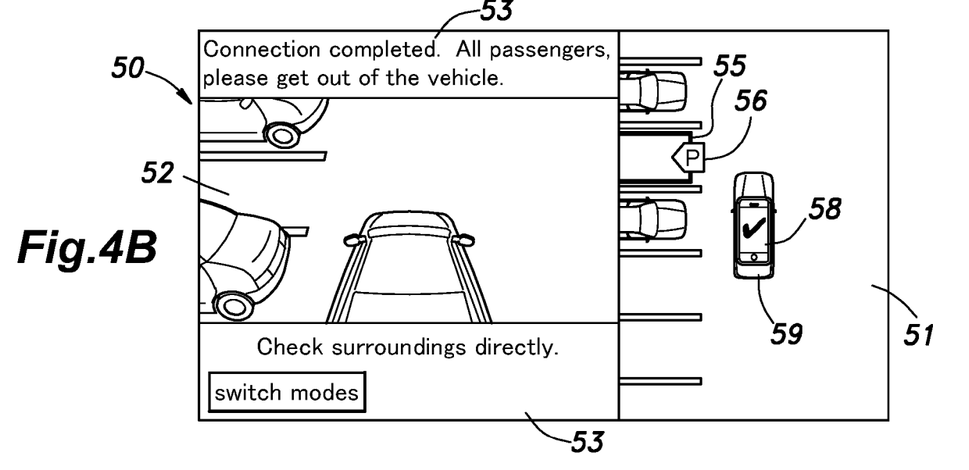
FIG. 4B is a diagram showing a screen display of the touch panel for indicating "connection completed"
Figure 5B:
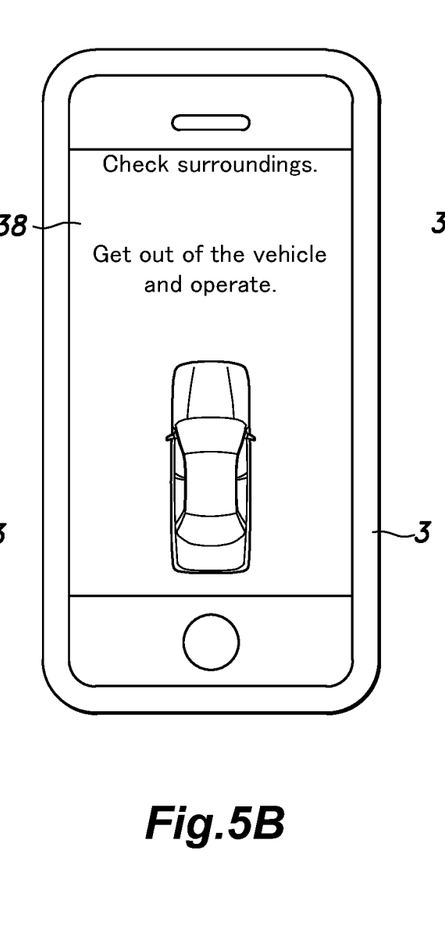
FIG. 5B is a diagram showing a screen display of the operation terminal indicating "connection completed"

When stable communication is established between the control device 15 and the operation terminal 3 and the authentication of the operation terminal 3 is completed, the communication status display 58 switches to the display corresponding to "connection completed," as shown in FIG. 4B. In addition, the action plan unit 43 displays, in the upper instruction window 53 of the parking assist screen 50, a display (message) indicating that the connection is completed and prompting the user to get out of the vehicle. Also, as shown in FIG. 5B, the operation terminal 3 displays, on the input/output unit 38, a display (message) indicating that the connection is completed and prompting the user to get out of (exit) the vehicle.

When the control device 15 determines that the connection between the control device 15 and the operation terminal 3 is completed and the operation terminal 3 has departed from the control device 15, the control device 15 may delete the display on the touch panel 32. Thereby, energy consumption by the touch panel 32 can be suppressed. For example, the control device 15 preferably determines that the operation terminal 3 has departed from the control device 15 by detecting that the connection between the control device 15 and the operation terminal 3 is completed, thereafter a door of the vehicle is opened, thereafter the door is closed, and thereafter the door is locked. The vehicle sensor 8 preferably includes a door opening/closing sensor and a door lock sensor. Also, the control device 15 may acquire the distance between the control device 15 and the operation terminal 3 based on the strength of the radio wave signal received from the operation terminal 3 and determine that the operation terminal 3 has departed from the control device 15 when the acquired distance is greater than or equal to a prescribed value. Also, the control device 15 may acquire the positions of the control device 15 and the operation terminal 3 based on the GNSS signal, acquire the distance between the control device 15 and the operation terminal 3 from the positions of the control device 15 and the operation terminal 3, and determine that the operation terminal 3 has departed from the control device 15 when the acquired distance is greater than or equal to the prescribed value.

Figure 5C:
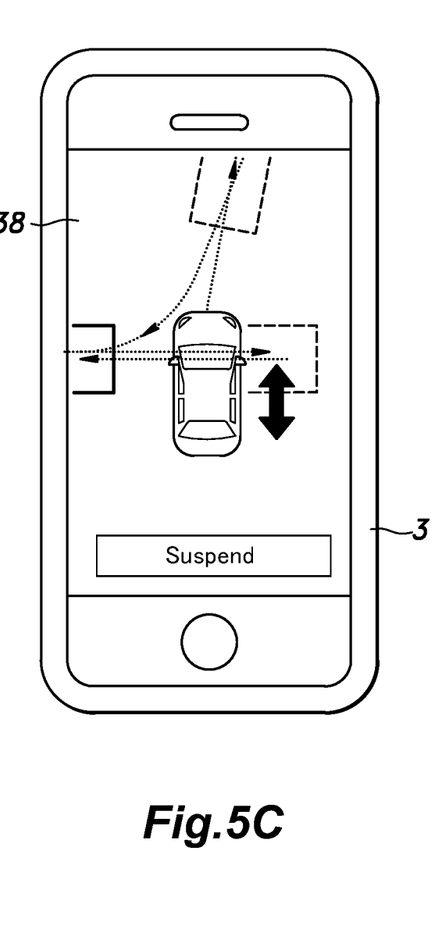
FIG. 5C is a diagram showing a screen display of the operation terminal showing an operation screen.

When the control device 15 determines that the connection between the control device 15 and the operation terminal 3 is completed and the operation terminal 3 has departed from the control device 15, the control device 15 makes the input/output unit 38 of the operation terminal 3 display an operation image of the vehicle, as shown in FIG. 5C. When the user performs an operation input with the input/output unit 38, the operation terminal 3 transmits an operation amount to the action plan unit 43. The action plan unit 43 moves the vehicle along the trajectory based on the recognition result of the external environment recognizing unit 41 and the received operation amount, thereby to perform a driving process of moving the vehicle to the parking position. Namely, the action plan unit 43 corresponds to the moving body control unit which performs a driving process of moving the moving body (vehicle) to the target position (parking position). In the present embodiment, the action plan unit 43 sets the movement amount of the vehicle depending on an amount of swiping on the input/output unit 38 of the operation terminal 3.

When the vehicle arrives at the parking position, the action plan unit 43 executes a parking process. In the parking process, the action plan unit 43 first drives the shift actuator to set the shift position (shift range) to a parking position (parking or P range) and stops the powertrain 4. When the powertrain 4 is stopped, the action plan unit 43 transmits a parking completion signal to the operation terminal 3. When the parking completion signal is received by the input/output unit 38, the operation terminal 3 displays a notification that the parking has completed on the screen. Namely, the parking position corresponds to the position where the vehicle is parked, namely, a stop position where the vehicle is to be stopped.

The remote operation system 1 according to the foregoing embodiment can prompt the user to activate the operation terminal 3. Since the communication status display 58 is displayed in the look-down image 51, the user is less likely to overlook the communication status display 58. Also, since the communication status display 58 is displayed to be superimposed on the vehicle image 59, the image of the surroundings of the vehicle can be maintained. Therefore, it is easy for the user to recognize the situation around the vehicle. Further, if the entirety of the communication status display 58 displayed to be superimposed on the vehicle image 59, it becomes even easier for the user to recognize the situation around the vehicle.

Since the communication status display 58 includes the display corresponding to "during connection attempt" and the display corresponding to "connection completed," the user can recognize the connection status between the operation terminal 3 and the control device 15 by viewing the communication status display 58.

When the connection with the operation terminal 3 is completed, the control device 15 makes the touch panel 32 display a display that prompts the user to get out of the vehicle, and therefore, the user can recognize that the next procedure is to get out of the vehicle by viewing the touch panel 32. Also, the user can recognize that the next procedure is to get out of the vehicle by viewing the input/output unit 38 of the operation terminal 3.

When the control device 15 determines that the connection between the control device 15 and the operation terminal 3 is completed and the operation terminal 3 has departed from the control device 15, the control device 15 makes the input/output unit 38 (display unit) of the operation terminal 3 display the operation image 61 of the vehicle (moving body). Thereby, the user can operate the vehicle remotely by using the operation terminal 3 after getting out of the vehicle and departing from the vehicle.

Concrete embodiments of the present invention have been described in the foregoing, but the present invention is not limited to the above embodiments and may be modified or altered in various ways. For example, instead of being displayed in the look-down image 51, the communication status display 58 may be displayed to be superimposed on the vehicle image in the three-dimensional image 52.

The invention claimed is:

1. A remote operation system for a moving body, comprising:
 a control device provided on the moving body; and
 an operation terminal configured to receive input from a user and to communicate with the control device, wherein the moving body comprises a display device and an external environment sensor that acquires surrounding information of the moving body, and the control device creates a surrounding image based on the surrounding information, the surrounding image being an image showing the moving body and its surroundings as seen from above, makes the display device display the surrounding image, and in a case where communication between the control device and the operation terminal is performed, makes the display device display the surrounding image in which an entirety of a communication status display showing a status of communication with the control device and the operation terminal is superimposed on an image of the moving body included in the surrounding image.

2. The remote operation system according to claim 1, wherein the communication status display includes a display corresponding to "during connection attempt" and a display corresponding to "connection completed".

3. The remote operation system according to claim 1, wherein when connection with the operation terminal is completed, the control device makes the display device display a display that prompts the user to exit the moving body together with the surrounding image.

4. The remote operation system according to claim 1, wherein the operation terminal has a display unit and, when connection with the control device is completed, makes the display unit display a display that prompts the user to exit the moving body.

5. The remote operation system according to claim 4, wherein when the control device determines that the connection between the control device and the operation terminal is completed and the operation terminal has departed from the control device, the control device makes the display unit of the operation terminal display an image for operation of the moving body.

6. The remote operation system according to claim 4, wherein when the control device determines that the connection between the control device and the operation terminal is completed and the operation terminal has departed from the control device, the control device turns off the display on the display device.

7. The remote operation system according to claim 5, wherein the control device determines that the operation terminal has departed from the control device when the control device detects that the connection between the control device and the operation terminal is completed, thereafter a door of the moving body is opened, thereafter the door is closed, and thereafter the door is locked.

8. The remote operation system according to claim 5, wherein the control device acquires a distance between the control device and the operation terminal based on a strength of radio wave signal received from the operation terminal and determines that the operation terminal has departed from the control device when the acquired distance is greater than or equal to a prescribed value.

* * * * *